(12) United States Patent
Spikes et al.

(10) Patent No.: US 11,738,613 B1
(45) Date of Patent: Aug. 29, 2023

(54) DRONE AIR TO GROUND TRANSITION SYSTEM

(71) Applicants: Christopher Cade Spikes, Monroe, LA (US); Daniel Caleb Kumler, Blairsville, GA (US)

(72) Inventors: Christopher Cade Spikes, Monroe, LA (US); Daniel Caleb Kumler, Blairsville, GA (US)

( * ) Notice: Subject to any disclaimer, the term of this patent is extended or adjusted under 35 U.S.C. 154(b) by 0 days.

(21) Appl. No.: 17/720,494

(22) Filed: Apr. 14, 2022

Related U.S. Application Data

(60) Provisional application No. 63/258,217, filed on Apr. 19, 2021.

(51) Int. Cl.
| | | |
|---|---|---|
| B60F 5/02 | (2006.01) |
| B64C 39/02 | (2023.01) |
| B64C 27/02 | (2006.01) |
| B64U 10/13 | (2023.01) |
| B64U 30/20 | (2023.01) |
| B64U 50/19 | (2023.01) |
| B64C 37/00 | (2006.01) |
| B64D 27/24 | (2006.01) |
| B64D 1/12 | (2006.01) |
| G05D 1/10 | (2006.01) |
| B60B 19/00 | (2006.01) |

(52) U.S. Cl.
CPC ............... *B60F 5/02* (2013.01); *B64C 37/00* (2013.01); *B64C 39/024* (2013.01); *B64D 1/12* (2013.01); *B64D 27/24* (2013.01); *B60B 19/00* (2013.01); *B64U 10/13* (2023.01); *B64U 30/20* (2023.01); *B64U 50/19* (2023.01); *B64U 2201/10* (2023.01); *G05D 1/101* (2013.01)

(58) Field of Classification Search
CPC ........... B64C 37/00; B60F 5/02; B64U 10/70; B64U 3/293
USPC .......................................................... 244/50
See application file for complete search history.

(56) References Cited

U.S. PATENT DOCUMENTS

| | | | | |
|---|---|---|---|---|
| 2020/0172234 | A1* | 6/2020 | Neff | B64C 29/0033 |
| 2021/0316874 | A1* | 10/2021 | Resnick | B60L 3/0023 |
| 2021/0387739 | A1* | 12/2021 | Neff | B64C 25/405 |
| 2022/0332413 | A1* | 10/2022 | Railings | B64U 50/14 |

FOREIGN PATENT DOCUMENTS

| | | | |
|---|---|---|---|
| AT | 520463 B1 * | 2/2020 | ............. B60B 19/00 |
| CN | 111845232 A * | 10/2020 | |
| CN | 112009647 A * | 12/2020 | ................ B60F 5/02 |

(Continued)

*Primary Examiner* — Christopher P Ellis
(74) *Attorney, Agent, or Firm* — Jones Walker LLP

(57) ABSTRACT

An unmanned aerial vehicle (UAV) having a plurality of arms and a land/air drive assembly attached to each arm. The land/air drive assembly includes (i) a multi-speed motor assembly; (ii) a propeller having a first diameter and driven by the motor assembly at a first speed; and (iii) a ground drive wheel having a second diameter greater than the first diameter and driven by the motor assembly at a second speed slower than the first speed. A drive assembly orientation actuator is positioned between each arm and each drive assembly, wherein the orientation actuator is configured to, on command, rotate the drive assembly between a flight position and ground drive position approximately perpendicular to the flight position.

20 Claims, 5 Drawing Sheets

(56) References Cited

FOREIGN PATENT DOCUMENTS

| | | | | | |
|---|---|---|---|---|---|
| CN | 112498673 | A | * | 3/2021 | ................ B60F 5/02 |
| CN | 114019993 | A | * | 2/2022 | |
| CN | 114132499 | A | * | 3/2022 | |
| CN | 114407597 | A | * | 4/2022 | |
| CN | 115768688 | A | * | 3/2023 | |
| GB | 2586835 | A | * | 3/2021 | ................ B60F 5/02 |
| KR | 102128678 | B1 | * | 2/2020 | |
| KR | 101984540 | B1 | * | 6/2021 | |
| WO | WO-2018213836 | A1 | * | 11/2018 | ................ B60F 5/02 |
| WO | WO-2021196062 | A1 | * | 10/2021 | |
| WO | WO-2022000922 | A1 | * | 1/2022 | |

* cited by examiner

DRONE AIR TO GROUND TRANSITION SYSTEM

I. CROSS-REFERENCE TO RELATED APPLICATION

This application claims the benefit under 35 USC 119(e) of U.S. Provisional Application No. 63/258,217 filed Apr. 19, 2021, which is incorporated by reference herein in its entirety.

II. BACKGROUND OF INVENTION

Unmanned aerial vehicles ("UAVs" or "drones") have become increasing used for many purposes, including military and law enforcement applications. In the military and law enforcement roles, UAVs are often used for reconnaissance. In the reconnaissance role, it is often beneficial for the UAV to be capable of maneuvering quietly into restricted spaces or to quietly reposition itself for better/different fields of view. A UAV having an efficient form of ground locomotion allowing precise orientation of its field of view and slow, stealthy approach to a target area, would be a significant advantage in the UAV field.

III. SUMMARY OF SELECTED EMBODIMENTS OF INVENTION

In one embodiment of the invention, the UAV has a plurality of arms and a land/air drive assembly attached to each arm. This land/air drive assembly includes (i) a multi-speed motor assembly; (ii) a propeller having a first diameter and driven by the motor assembly at a first speed; and (iii) a ground drive wheel having a second diameter greater than the first diameter and driven by the motor assembly at a second speed slower than the first speed. A drive assembly orientation actuator positioned between each arm and each drive assembly, wherein the orientation actuator is configured to, on command, rotate the drive assembly between a flight position and ground drive position approximately perpendicular to the flight position.

IV. BRIEF DESCRIPTION OF DRAWINGS

V. DETAILED DESCRIPTION

Figure 1:
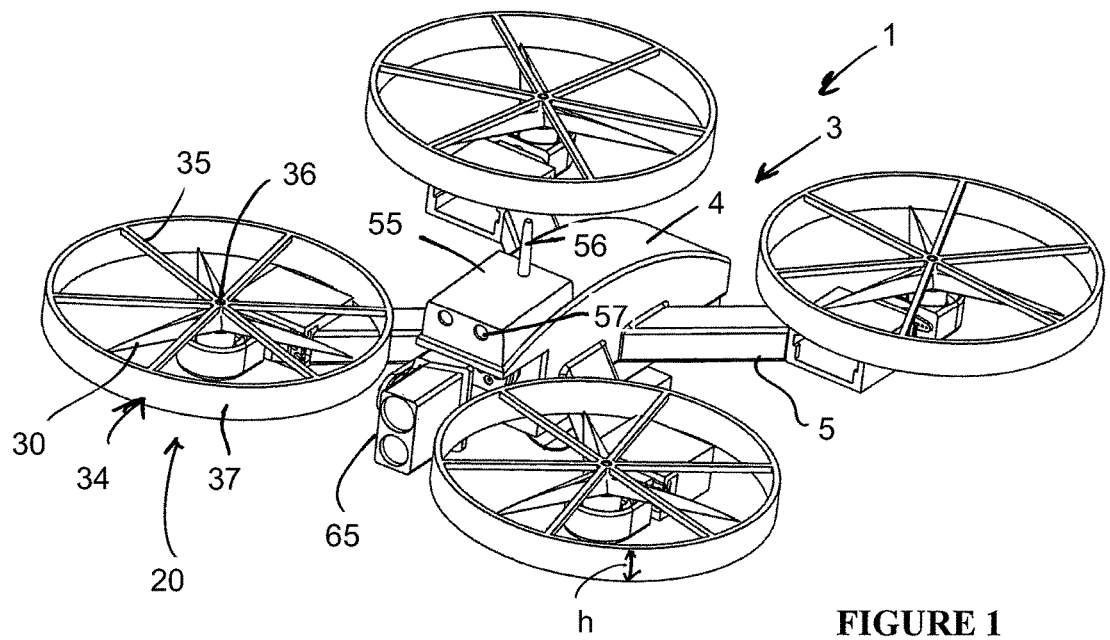
FIG. 1 is a top perspective view of one embodiment of the UAV in flight mode.
Figure 2:
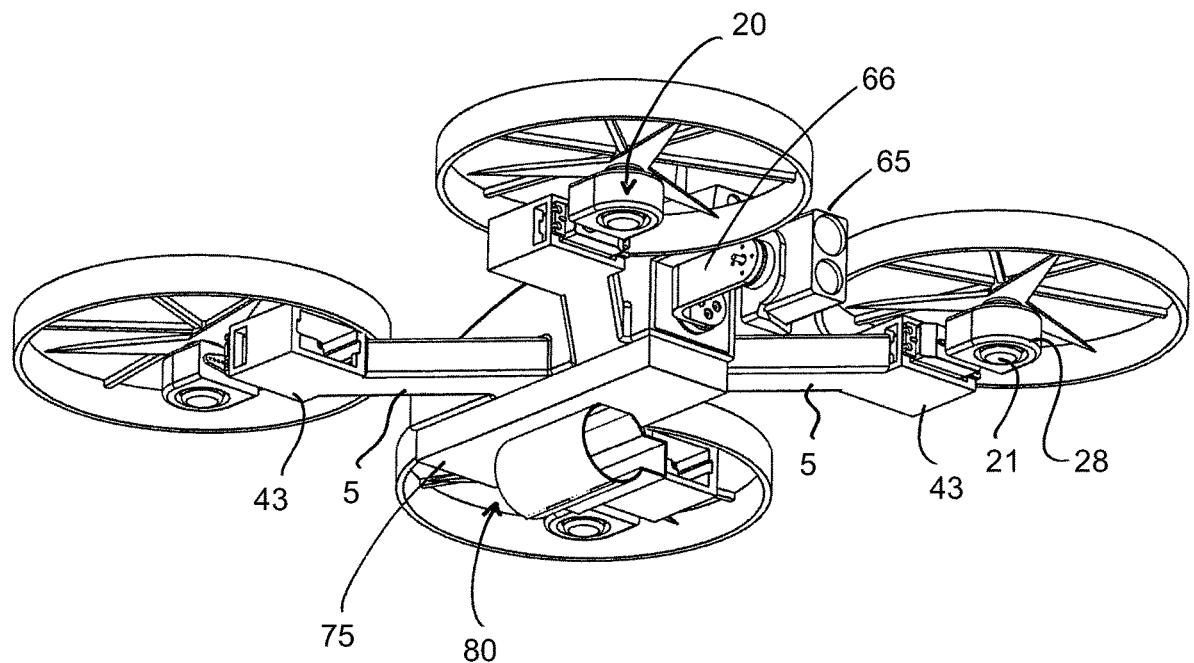
FIG. 2 is a bottom perspective view of the FIG. 1 UAV.

FIGS. 1 and 2 illustrate one embodiment of the UAV of the present invention. UAV 1 will generally comprise central body 4 with arms 5 extending away from the body with the central body and arms sometimes referred to as frame 3. While the illustrated embodiment has four arms, other embodiments could have two, three, five, six, or even more arms (and accompanying propellers). As best seen in FIG. 2, the arms 5 will terminate with servo housings 43 attached to the arms. Connected to the servo housings 43 will be motor mounts 28 which house the motors powering propellers 30. In typical embodiments, the propellers 30 are between six and ten inches in diameter. As best seen in FIG. 1, other general components of UAV 1 include a camera pod 65 mounted on the front portion of UAV body 4 by camera mounting arms 66 (see FIG. 2). Camera pod 65 may be mounted upon on a 2 or 3-axis gimbal to stabilize the camera as well as manipulate the camera's angle along its degrees of freedom. In one example, the camera system is a Teledyne FUR Hadron dual camera with an IR sensor that provides thermal imaging capabilities coupled with a 4k EO camera. FIG. 2 also shows the payload release assembly 80 (described in more detail below), which may also sometimes be referred to as a "payload delivery system" or "payload delivery assembly."

Figure 3A:
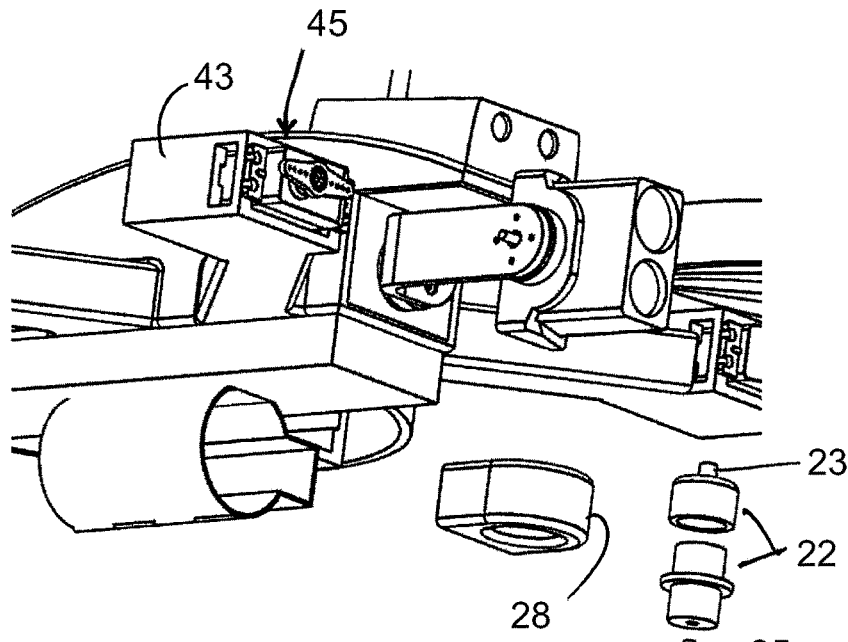
FIG. 3A is a partial exploded view of one embodiment of the land/air drive assembly.

In the illustrated embodiments, each propeller 30 and the motor powering it will be part of a dual land/air drive assembly 20 connected to each arm 5. This land/air drive assembly 20 generally includes propeller 30, the ground drive wheel 34, and a multi-speed motor assembly 21. In FIG. 1, the ground drive wheel 34 includes wheel rim 37 connected to wheel spokes 35 converging at wheel hub 36. As shown in FIG. 1, with the spokes 35 engaging the top of wheel rim 37, wheel rim 37 has a sufficient diameter and height "h" that propeller 30 is enclosed within an inner ring space (below spokes 35) formed by wheel rim 37. It will be apparent that this allows ground drive wheel 34 to act as a propeller guard to aid in preventing damage to the propeller, thus the ground drive wheels 34 typically have a diameter slightly greater than the propellers, e.g., typically in the seven to eleven inch range (but of course, the wheels could be significantly greater in diameter than the propellers). The multi-speed motor assembly 21 is a drive assembly which will allow the propeller 30 to be driven at a higher speed and the ground drive wheel 34 to be driven at a lower speed. In one example, the multi-speed moto assembly 21 is a dual motor concentric shaft design, such as the DZP30 Contra-rotating 1500 KV Dual Brushless Motor provide by OverskyRC Corporation of Wuhan, CN. FIG. 3A suggests conceptually how the dual motor concentric shaft design will have a first high speed motor section 22 that drives outer hollow shaft 23. A second lower speed motor 24 will have inner shaft 25 which extends through outer hollow shaft 23. This configuration will allow outer shaft 23 to be connected to propeller 30 and inner shaft 25 to be connected to ground drive wheel 34, i.e., the propeller and drive wheel are co-centrically located on the multi-speed motor assembly. Higher speed motor 22 will typically be able to drive the propeller 30 at speeds of between 1000 and 13750 RPM. Lower speed motor 24 will typically be able to drive the ground drive wheel 34 at speeds of between 0 and 500 RPM (or any subrange in between). However, there could be many different ways of providing multi-speed motor assembly besides two motors with concentric shafts. For example, it could be possible to provide a single electric motor with a wide enough speed range to drive both the propeller and the ground drive wheel. Alternatively, power from a single motor might be directed to a gear arrangement which then provides the different speed ranges need for both the propeller and ground drive wheel.

Figure 3B:
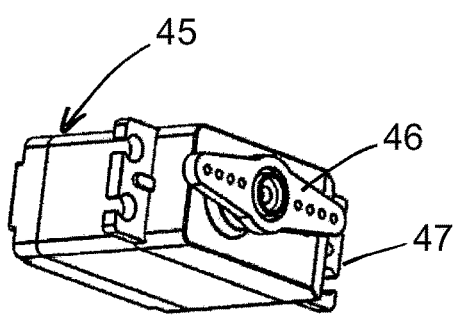
FIG. 3B is a perspective view of the drive assembly orientation servo.
Figure 3C:
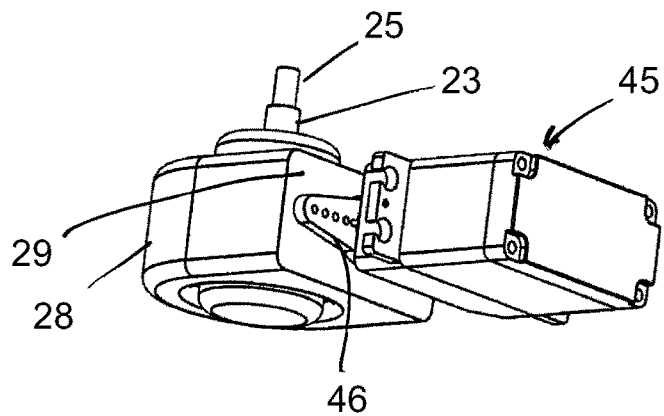
FIG. 3C is a perspective view of the orientation servo engaging the motor mount.
Figure 4A:
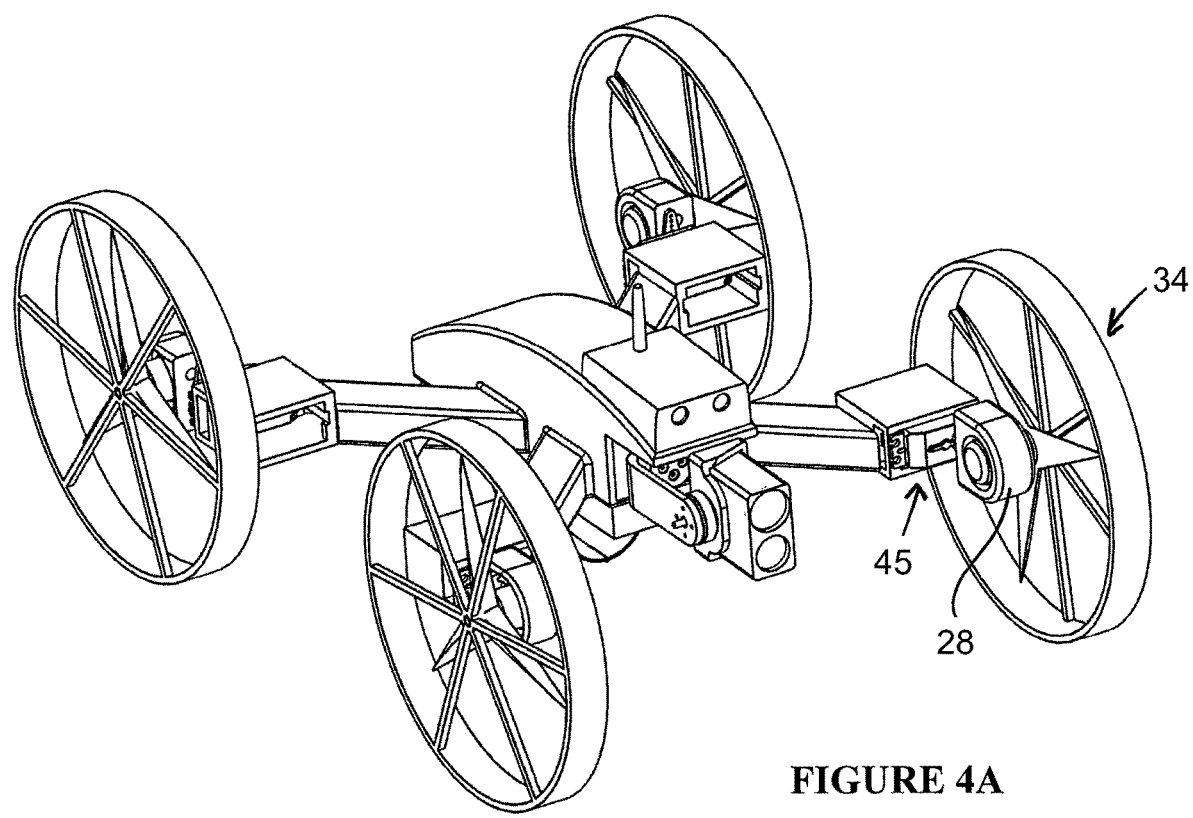
FIG. 4A is a perspective view of the FIG. 1 UAV in ground drive mode.
Figure 4B:
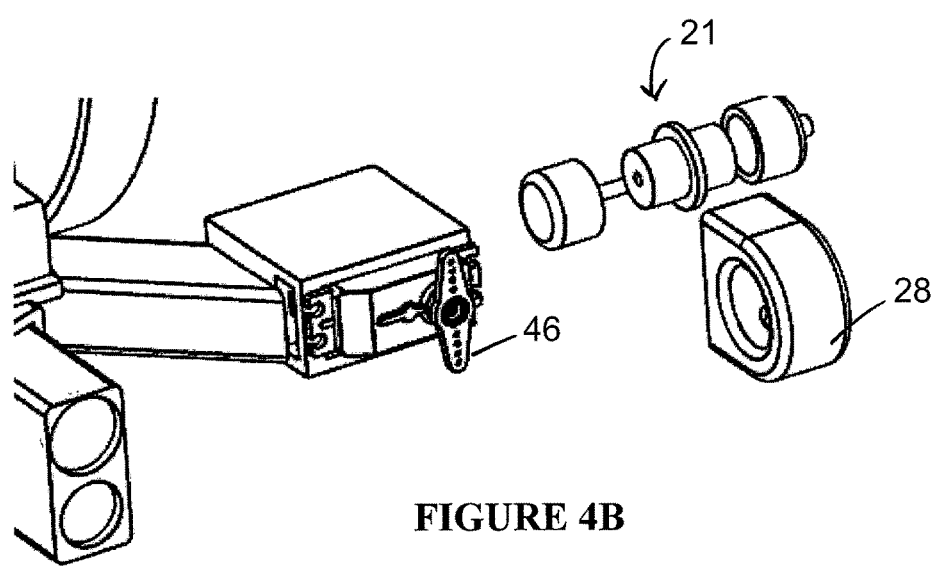
FIG. 4B is a partial exploded view of the land/air drive assembly in ground drive mode.

As suggested above, each arm 5 includes a servo housing 43. As most clearly seen in FIG. 3A, a drive assembly orientation servo (or simply "orientation servo") 45 is position in the servo housings 43. In one embodiment, orientation servo 45 could be a HS-311 servo available from HITEC RCD USA, Inc. of San Diego, Calif. FIG. 3B shows how the orientation servo 45 includes mounting brackets 57 to secure orientation servo 45 in servo housing 43 and the servo arm 46. Orientation servo 45 can be electrically controlled such that servo arm 46 transitions approximately 90° from the "horizontal" or "flight" position seen in FIG. 3B to the "vertical" or "ground" position seen in FIG. 4B. In certain embodiments, this 90° change in orientation can take place in under three seconds, and more preferably in under one second. FIG. 3C shows how servo arm 46 will be attached to the rear surface 29 of motor mount 28. Thus, it can readily be envisioned how orientation servo 45 transitions motor mount 28, and thus propeller 30 and ground drive wheel 34, from its flight position as seen in FIG. 1 to its ground drive position seen in FIG. 4A. Once in the ground drive position, power is directed to the low-speed motor driving ground wheels 34. Steering in the ground drive mode may be accomplished by selectively applying power to different ground wheels. The land/air drive assembly 20 when combined with the orientation servo 45 may sometimes be referred to as the drone air to ground transition system (DAGTS). While the illustrated embodiments describe an orientation "servo" (i.e., an actuating device which moves to a predetermined angular position such as 90° or 180°), the invention could include any type of actuator capable of rotating the motor mount 28. For example, in an alternate embodiment, a stepper motor could function as the drive assembly orientation actuator and could move to any angular position to which the motor is driven.

In preferred embodiments, orientation servo 45 transitions the propellers/ground drive wheels from the flight position to the ground drive position in less than one or two seconds. This allows the UAV to be hovering within a few feet of the landing surface when the propellers cease providing lift and the drone begins dropping. In other words, the UAV makes a "substantially unpowered decent," i.e., the decent is with a lift from the propellers of less than 75% (alternatively 85% or 90%) of that needed to allow the UAV to hover. The more rapid the transition by orientation servo 45, the less drop impact the UAV needs to withstand when transitioning from flight to ground drive mode. And while it is generally most efficient to have the ground drive position of the wheels oriented 90° from the flight position, this is not strictly necessary, and the ground drive wheels could be oriented from 75° to 105° from the flight position. Preferably, the position of the UAV arms 5 and the diameter of the ground drive wheels 34 will be configured such that, in the ground drive position, the lower surface of the drone body will have at least four inches of clearance from the ground surface. In other words, the UAV body will have at least four inches to accommodate a payload when the UAV is in ground drive mode.

Figure 5:
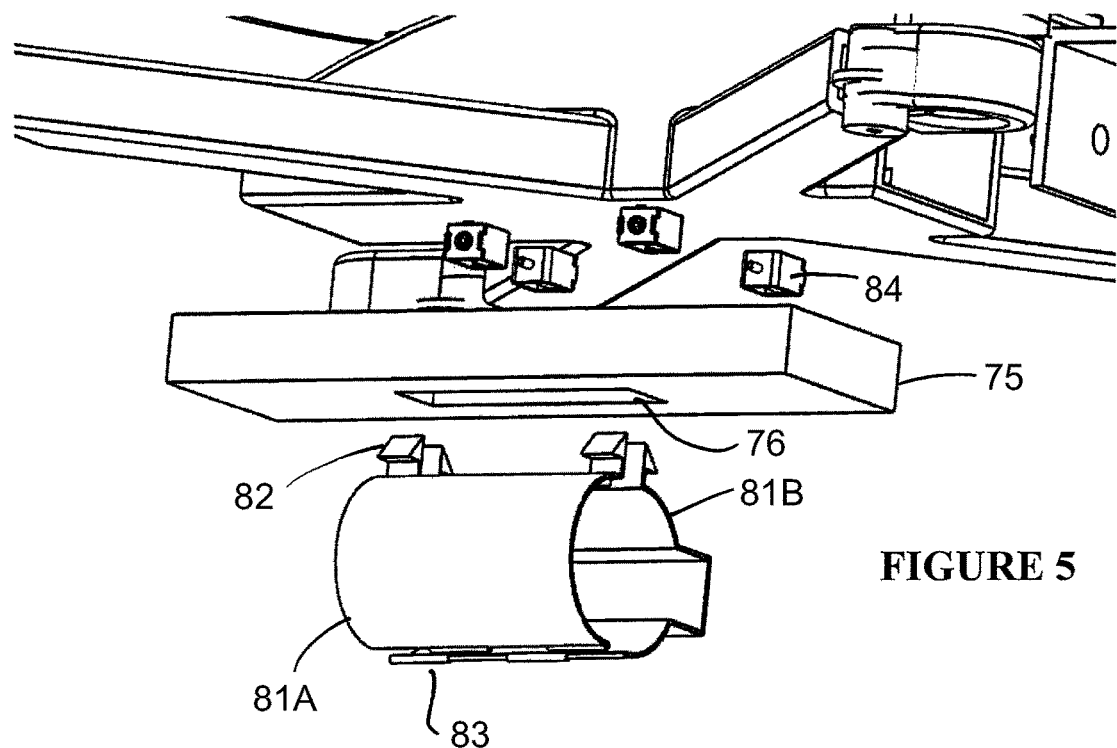
FIG. 5 is a partial exploded view of the payload release assembly.
Figure 6:
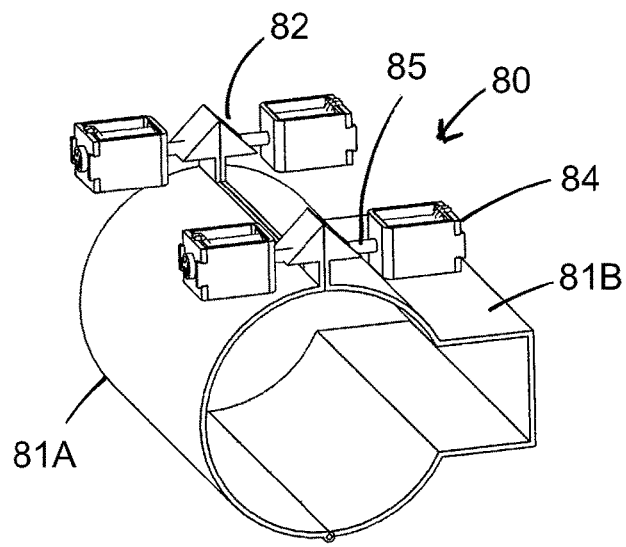
FIG. 6 is an assembled view of the payload release assembly.

FIGS. 5 and 6 illustrate one embodiment of the payload release assembly 80. FIG. 5 suggests how the opening 76 in payload assembly housing 75 will be the attachment point for the shell halves 81A and 81B. Each shell half 81A and 81B will have two retaining tabs 82 and the two shell halves will be joined by partial hinge 83. Partial hinge 83 is constructed to keep the shell halves together when the retaining tabs 82 are positioned adjacent to one another (as in FIG. 6) but allow the shell halves to separate along partial hinge 83 as the retaining tabs 82 move away from one another. When the shell halves 81 are assembled, the retaining tabs 82 may be inserted into opening 76 of payload assembly housing 75. Inside of payload assembly housing 75 are a series of release solenoids 84 corresponding to the retaining tabs 82. Release solenoids 84 will have retractable release pins 85 which, when in their extended position (e.g., as in FIG. 6), will engage retaining tabs 82 and maintain the shell halves 81 in their closed position and connected to payload assembly housing 75. Activation of release solenoids 84 will retract release pins 85 from engagement with retaining tabs 82, thus allowing the shell halves 81 to fall away from payload assembly housing 75 and to open, releasing the particular payload being carried by shell halves 81. Obviously, FIGS. 5 and 6 are only one example of a structure forming a payload release mechanism 80 and any number of conventional or future developed mechanisms could be employed. For example, a Picatinny-type rail could be placed on a bottom surface of the UAV body and payload assembly housing 75 could be adapted with clamps which grip the Picatinny rail. This would allow for a large number of different payload delivery systems to be used interchangeably with the UAV.

In one particular embodiment, the UAV may include a ground distance sensor, e.g., an ultra-sonic or light-based distance sensor. For example, in one embodiment, the ground distance sensor could be a Ground LiDAR-lite available from Garmin, Ltd. of Olathe, Kans. The ground distance sensor could be activated when it is desired to land the UAV. As the UAV lowers toward its landing surface, at a predetermined height above the landing surface, as detected by the ground distance sensor, the controller would receive a signal from the ground distance sensor and automatically activate orientation servos 45 to transition to the ground drive position. Conversely, when the UAV is in the ground drive mode, the UAV may be returned to flight mode by the orientation servos rotating the dual land/air drive assemblies 20 back to flight position and the propellers being powered to flight RPM by high speed motors 22.

Figure 7:
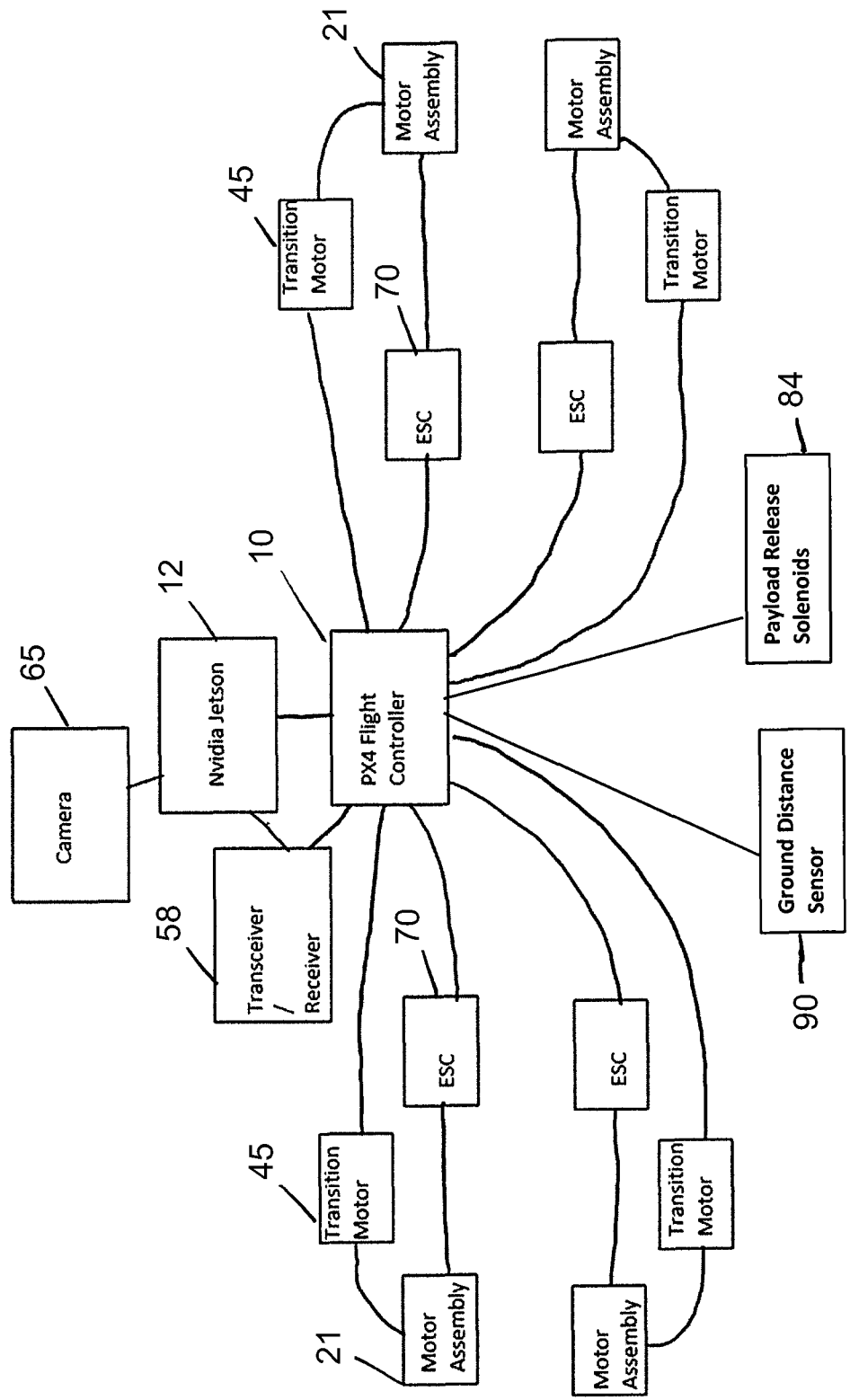
FIG. 7 is an electrical component diagram of one UAV embodiment.

FIG. 7 is an electronic component diagram illustrating one example layout of the UAVs electronic system. The UAV may employ a convention flight controller 10, such as a PX4 configured processor. The PX4 software package is available from HolyBro, Ltd of Hong Kong, PRC. The flight controller 10 will control the electronic speed controllers (ESCs), which are the electronic circuits which control and regulate the speed of the multi-speed motor assemblies 21. The flight controller can also control the orientation servos 45, along with the payload release solenoids 84 and the ground distance sensor 90. The camera pod or camera package 65 may be operated by a separate System on Module (SOM) that includes a GPU, CPU, memory, power management, and high-speed interfaces. One example of such SOM is the NVIDIA Jetson SOM available from NVIDIA Corporation of Santa Clara, Calif. Instructions will be transmitted to, and data transmitted from transceiver 58 (hidden from view inside the UAV body). The embodiment of the UAV seen in FIGS. 1 and 2 include a detachable DART module 55 which includes LED lights 57. The DART module includes its own batteries and standalone two-way audio communication system with an integrated LED flashlights 57. The DART module seen in the illustrated embodiment is available from Botlink of Fargo, N. Dak.

The ability of the above described UAV to efficiently transition from flight mode to ground drive mode is a significant technical advance in the UAV field. And while a skilled operator may manually control the transition from flight to ground mode, preferred embodiments of the UAV will implement an autonomous air-to-ground transition. The autonomous transition process will be initiated by the operator pressing a button on the screen of the operator flight control system (e.g., a tablet or laptop computer) or toggling a backup analog switch on the housing of the control system. Once the autonomous transition enabling signal is transmitted and the UAV enters the autonomous transition mode, the PX4 flight controller will monitor height data received from ground distance sensor. The PX4 flight controller will use this data to descend or ascend the UAV to an optimal transition altitude ranging from about 10-15 inches above the landing surface. Once this optimal altitude is achieved, then power and the command for the transition rotation is sent to the servos, thereby completing the transition process.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

Although the invention has been described in terms of specific embodiments, all obvious variations and modifications should be considered as falling within the scope of invention. For example, an alternative embodiment not illustrated could include retractable landing gear, which when extended, would position the drive wheels off the ground. In this embodiment, the drone could be landed in flight mode with the landing gear down, and then the orientation servos rotated into ground drive position, after which the landing gear would be retracted to bring the drive wheels into contact with the ground. Similarly, while 10-15 inches is described above as a preferred ground transition height, other embodiments might perform the transition at higher or lower elevations, e.g., less than 5 feet, or less than 3 ft. All such variations are within the scope of invention.

The invention claimed is:

1. An unmanned aerial vehicle (UAV) comprising:
   (a) a body with at least two extending arms;
   (b) a land/air drive assembly attached to each arm, each drive assembly including:
      (i) a multi-speed motor assembly;
      (ii) a propeller driven by the motor assembly at a first speed, the propeller having a first diameter;
      (iii) a ground drive wheel driven by the motor assembly at a second speed slower than the first speed, the ground drive wheel having a second diameter greater than the first diameter; and
   (c) a drive assembly orientation servo positioned between each arm and each drive assembly, wherein the orientation servo is configured to, on command, rotate the drive assembly between a flight position and a ground drive position approximately perpendicular to the flight position.

2. The UAV of claim 1, wherein the ground drive wheel has an inner ring space and the propeller is positioned within the inner ring space.

3. The UAV of claim 1, wherein the multi-speed motor assembly comprises a high speed motor and a low speed motor.

4. The UAV of claim 3, wherein the high speed motor and low speed motor have concentric drive shafts.

5. A method of operating an unmanned aerial vehicle (UAV), wherein the UAV comprises:
   (a) a body with at least two extending arms;
   (b) a land/air drive assembly attached to each arm, each drive assembly including:
      (i) a multi-speed motor assembly;
      (ii) a propeller driven by the motor assembly at a first speed, the propeller having a first diameter;
      (iii) a ground drive wheel driven by the motor assembly at a second speed slower than the first speed, the ground drive wheel having a second diameter greater than the first diameter; and
   (c) a drive assembly orientation actuator positioned between each arm and each drive assembly, wherein the orientation actuator is configured to, on command, rotate the drive assembly between a flight position and ground drive position approximately perpendicular to the flight position;
   wherein the method comprises the steps of:
   (d) flying the UAV to a landing location having a landing surface;
   (e) positioning the UAV to a height of less than 3 feet above the landing surface;
   (f) transitioning the orientation actuator to the ground drive position in less than two seconds;
   (g) whereby the UAV makes a substantially unpowered decent to the landing surface.

6. The method of claim 5, wherein the UAV is positioned to a height of less than 1.5 feet above the landing surface when the orientation actuator transitions.

7. The method of claim 5, wherein the UAV includes a ground distance sensor and the ground distance sensor detects a distance to the landing surface.

8. The method of claim 7, wherein the UAV includes a controller, and the controller monitors the distance to the landing surface generated by the ground distance sensor.

9. The method of claim 8, wherein at a predetermined height above the landing surface, the controller transitions the orientation actuator to the ground drive position.

10. The method of claim 5, wherein the UAV changes its position on the landing surface by powering the ground drive wheels.

11. An unmanned aerial vehicle (UAV) comprising:
    (a) a body with at least two extending arms;
    (b) a land/air drive assembly attached to each arm, each drive assembly including:
       (i) a multi-speed motor assembly;
       (ii) a propeller driven by the motor assembly at a first speed, the propeller having a first diameter;
       (iii) a ground drive wheel driven by the motor assembly at a second speed slower than the first speed, the ground drive wheel having a second diameter greater than the first diameter; and
    (c) a drive assembly orientation actuator positioned between each arm and each drive assembly, wherein the orientation actuator is configured to, on command, rotate the drive assembly between a flight position and ground drive position approximately perpendicular to the flight position.

12. The UAV of claim 11, wherein the drive assembly orientation actuator is a servo.

13. The UAV of claim 11, wherein the ground drive wheel has an inner ring space and the propeller is positioned within the inner ring space.

14. The UAV of claim 11, wherein the multi-speed motor assembly comprises a high speed motor and a low speed motor.

15. The UAV of claim 14, wherein the high speed motor and low speed motor have concentric drive shafts.

16. The UAV of claim 11, wherein the orientation actuator is configured to rotate from the flight position to ground drive position is less than two seconds.

17. The UAV of claim 11, wherein the ground drive wheel includes a plurality of spokes extending from a wheel hub to a wheel rim.

18. The UAV of claim 16, wherein a hub of the propeller and a hub of the ground drive wheel are co-centrically located on the multi-speed motor assembly.

19. The UAV of claim 11, wherein the multi-speed motor assembly is position in a motor mount and the motor mount is connected to the orientation servo.

20. The UAV of claim 1, wherein (i) the UAV further comprises a ground sensor and a controller, and (ii) the controller instructs the orientation servo to rotate to the ground drive position upon receiving a signal from the ground sensor.

* * * * *